(12) United States Patent  
Bajan

(10) Patent No.: US 8,041,646 B2
(45) Date of Patent: Oct. 18, 2011

(54) METHOD AND SYSTEM FOR REAL TIME ONLINE DEBIT TRANSACTIONS

(75) Inventor: Joseph Peter Bajan, Nanaimo (CA)

(73) Assignee: E. E. System Corporation, Nanaimo (CA)

( * ) Notice: Subject to any disclaimer, the term of this patent is extended or adjusted under 35 U.S.C. 154(b) by 1231 days.

(21) Appl. No.: 11/423,706

(22) Filed: Jun. 13, 2006

(65) Prior Publication Data

US 2006/0287965 A1 Dec. 21, 2006

Related U.S. Application Data

(60) Provisional application No. 60/690,488, filed on Jun. 15, 2005.

(51) Int. Cl.
G06Q 30/00 (2006.01)
G07F 7/00 (2006.01)

(52) U.S. Cl. .......................................... 705/64; 705/35

(58) Field of Classification Search .................... 705/64, 705/35
See application file for complete search history.

(56) References Cited

U.S. PATENT DOCUMENTS

| | | | |
|---|---|---|---|
| 5,974,146 A | 10/1999 | Randle et al. | |
| 6,021,397 A * | 2/2000 | Jones et al. | 705/36 R |
| 6,594,647 B1 | 7/2003 | Randle et al. | |
| 6,609,113 B1 | 8/2003 | O'Leary et al. | |
| 7,567,925 B2 * | 7/2009 | Millary et al. | 705/35 |
| 2001/0023415 A1 | 9/2001 | Keil | |
| 2001/0032878 A1 | 10/2001 | Tsiounis et al. | |
| 2001/0039535 A1 | 11/2001 | Tsiounis et al. | |
| 2001/0042785 A1 * | 11/2001 | Walker et al. | 235/379 |
| 2002/0016749 A1 | 2/2002 | Borecki et al. | |
| 2002/0035539 A1 * | 3/2002 | O'Connell | 705/39 |
| 2002/0088851 A1 | 7/2002 | Hodes | |
| 2002/0111919 A1 | 8/2002 | Weller et al. | |
| 2003/0191669 A1 * | 10/2003 | Fitzgerald et al. | 705/2 |
| 2003/0195771 A1 * | 10/2003 | Fitzgerald et al. | 705/2 |

(Continued)

FOREIGN PATENT DOCUMENTS

| | | |
|---|---|---|
| CA | 2503740 | 9/2006 |
| WO | WO2006/128215 | 12/2006 |
| WO | WO2006/135264 | 12/2006 |

OTHER PUBLICATIONS

"Online Banking", "Banking Accounts & Packages", Nov. 17, 2006 [retrieved on Feb. 7, 2007], retrieved from Internet: http://www.rbcroyalbank.com.

(Continued)

Primary Examiner — Evens J Augustin
(74) Attorney, Agent, or Firm — Oyen Wiggs Green & Mutala LLP

(57) ABSTRACT

An online payment method is disclosed which permits users to make realtime debit card payments over the Internet. The payor and payee pre-register with the system by sending their PAN, encrypted PIN and encryption key to the system database using a debit card reader, and then enter user names and secret IDs to be associated with the PAN and PIN numbers. When an online transaction is made the payor enters its user name and ID which is sent to the system along with the transaction amount and the payee user name. The system sends out a standard POS transaction using the stored PAN, encrypted PIN and encryption key. If approved it sends out a credit POS transaction to the payee in the same way.

13 Claims, 5 Drawing Sheets

U.S. PATENT DOCUMENTS

| | | | |
|---|---|---|---|
| 2003/0200184 A1 | 10/2003 | Dominguez et al. | |
| 2004/0044739 A1* | 3/2004 | Ziegler | 709/213 |
| 2004/0088249 A1 | 5/2004 | Bartter et al. | |
| 2004/0117302 A1* | 6/2004 | Weichert et al. | 705/40 |
| 2004/0153405 A1* | 8/2004 | Millary et al. | 705/40 |
| 2004/0230536 A1* | 11/2004 | Fung et al. | 705/64 |
| 2005/0085931 A1 | 4/2005 | Willeby | |
| 2005/0182724 A1* | 8/2005 | Willard | 705/44 |
| 2005/0203843 A1* | 9/2005 | Wood et al. | 705/40 |
| 2006/0089906 A1* | 4/2006 | Rowley | 705/40 |

OTHER PUBLICATIONS

"OnDebit online real time payments", Mar. 28, 2004 [retrieved on Feb. 7, 2007], retrieved from Internet Archive's "WayBack Machine": http://www.ondebit.com.

"Interac Online", Aug. 10, 2005 [retrieved on Feb. 8, 2007], retrieved from Internet Archive's "WayBack Machine": http://www.interaconline.com.

"Interac Association: A Backgrounder", Jun. 2006, retrieved from Internet: www.interac.org.

* cited by examiner

METHOD AND SYSTEM FOR REAL TIME ONLINE DEBIT TRANSACTIONS

CROSS-REFERENCE TO RELATED APPLICATIONS

This application claims priority from U.S. provisional application Ser. No. 60/690,488 filed Jun. 15, 2005, which is pending.

TECHNICAL FIELD

The invention relates to the field of online transactions and more particularly to a system for the transfer of funds on payment for goods or services using the Internet.

BACKGROUND

In the existing Point of Sale (POS) PIN debit card system, the merchant swipes the customer's debit card, which captures the customer's card number (Primary Account Number (PAN)) and enters the amount of the transaction. The customer enters a secret Personal Identification Number (PIN) on a PIN pad, which encrypts the number and sends it with the PAN, the encryption key and the transaction amount to the bank for approval. Typically a different encryption key is used for each transaction. The bank decrypts the PIN, checks the PAN against the PIN and debits the customer's account by the amount of the transaction if the funds are available and sends a message back to the merchant approving or denying the transaction.

A second type of debit card is the signature debit card which is swiped at the merchant location and signed by the purchaser but no PIN number is entered. The system puts the transaction through the credit card system, but the amount of the transaction gets debited a few days later to the user's bank account and not the credit card account. The merchant pays the same commission as for a credit card transaction.

Currently on-line transactions are done by credit card but not PIN debit cards since the POS debit card equipment is not applicable for on-line merchants. However using credit cards for on-line sales causes the on-line merchant to incur the costs of the credit card commissions.

Various systems have been developed to facilitate on-line payments, such as electronic purses or wallets, but none of these have achieved wide acceptance due to a number of factors, including cumbersome procedures, unreasonable costs and unfair assignment of risk. Generally they involve setting up a trusted third party account. For example, United States patent application publication No. US 2002/0016749 discloses a system in which a user registers for an electronic cheque book service, acting as trusted third party in on-line transactions with merchants. The service maintains databases of IDs and passwords for both merchants and customers. United States patent application publication No. US 2003/0200184 A1, discloses a mobile account authentication service in which the customer enrolls with a trusted service which records PIN, PAN and other relevant data including passwords. The trusted service authenticates the customer's identity when he deals with on-line merchants in order to transact purchases.

United States patent application publication No. US 2001/0039535 discloses a method for a shopper to provide confidential payment information such as bank debit card numbers, PIN numbers, expiration dates, and similar data to a trusted third party ("TTP"). When the shopper conducts a transaction on an internet website, the TTP facilitates payment to the merchant without the user having access to the shopper's confidential information.

None of the existing systems provide a method whereby users can make PIN debit card transactions for online payments over the Internet as they would make credit card payments. In the following description, "debit card" will refer to PIN debit cards.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An online payment method is disclosed which permits users to make realtime debit card payments over the Internet. The payor and payee pre-register with the system by sending their PAN, encrypted PIN and encryption key to the system database using a debit card reader, and then enter user names and secret IDs to be associated with the PAN and encrypted PIN numbers and encryption keys. When an online transaction is made the payor enters its user name and ID which is sent to the system along with the transaction amount and the payee user name. The system then sends out a standard POS transaction in that amount using the stored PAN, encrypted PIN and encryption key. If approved, it sends out a credit POS transaction to the payee in the same way.

The present invention provides a method for online debit payments initiated by the payor. 1) Customer registers with the central system by swiping a bank debit card and entering his PIN number on a physical PIN pad, as if it were a POS transaction. The captured PAN and encrypted PIN and encryption key are sent to a database maintained by the system. The customer enters a user name (such as an email address) and a second secret ID number, different from the PIN which are associated with the stored PAN and encrypted PIN and encryption key. 2) A merchant registers with the system in the same way so the system has a PAN and an encrypted PIN and encryption key for its bank account associated with a merchant username such as an email address and a second secret ID number. 3) For a customer to make an online debit payment at the merchant's web page, the merchant through the system serves up a page with the merchant and transaction details such as the transaction value already entered and invites the customer to enter his or her user name. The customer enters his/her user name and second secret ID number which are sent to the system server. The system validates the customer user name and secret ID, validates the merchant user name and retrieves the customer's PAN and encrypted PIN and encryption key and forms and sends a standard debit POS transaction to the bank in the appropriate amount. If approved, it takes the merchant's PAN and encrypted PIN and encryption key and sends a second POS transaction crediting the merchant account. It then sends a receipt to the merchant once the transaction is completed. The system works because, in the United States, the same encrypted PIN number and encryption key can be used indefinitely for debit POS transactions other than duplicate transactions.

As a second variant to avoid rejection of duplicate transactions, on registration the system server decrypts the customer's PIN using the decryption key provided by the POS system and stores the decrypted PIN in a database. Since storage of a decrypted PIN in a database is a security risk, the PIN should be re-encrypted with a recoverable and usable key or otherwise stored to reduce the security risk. Each time the customer authorizes a debit transaction through the system, the server encrypts the PIN to form part of the POS debit transaction as if it were a POS terminal. The server may be operated by a Trusted Third Party.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
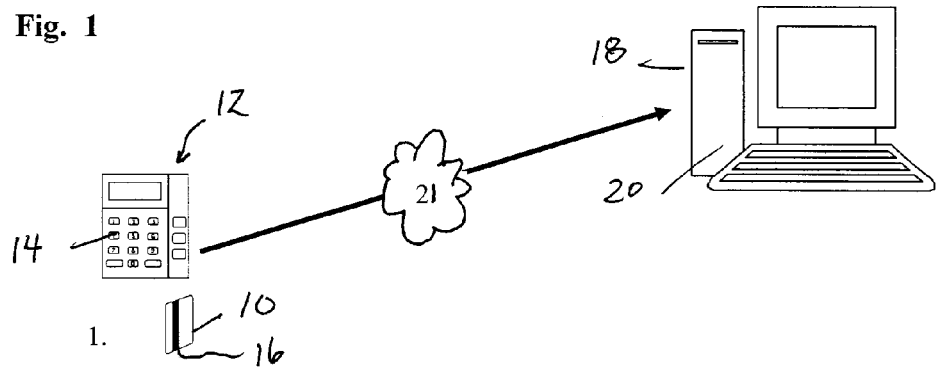
FIG. 1 is a schematic diagram illustrating part of the registration procedure for the invention.
Figure 2:
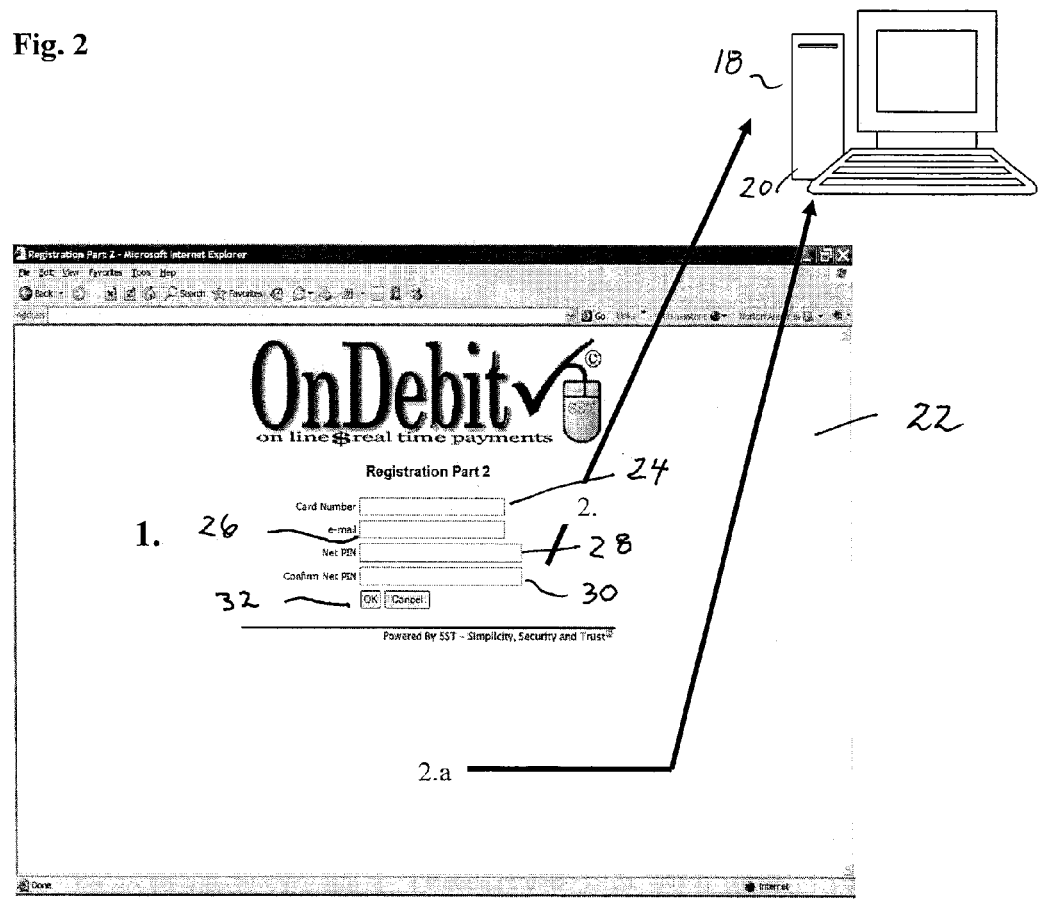
FIG. 2 is a schematic diagram illustrating a further part of the registration procedure for the invention.

With reference to FIG. 1, a customer registers with the system by swiping his or her bank debit card 10 through the system's standard POS debit card reader 12 which is connected to and communicates with a personal computer having the associated software required for the system. The card reader 12 captures the customer's card number (Primary Account Number or PAN) from the Track 2 Data on magnetic stripe 16 or a storage chip. The customer enters his or her secret Personal Identification Number (PIN) on the physical PIN pad 14 as if it were a POS transaction. The debit card reader 12 encrypts the PIN number and sends it with the PAN and the encryption key via the Internet 21 to the system's server 18, where they are stored on associated database 20 maintained by the system.

As the second step in registration, the customer accesses the system's web site using an internet browser, and logs into the registration page 22, enters the customer's PAN number at 24 and enters a user name (such as an email address) at 26 and a second secret ID number, the "Net PIN", at 28, different from the PIN, and re-enters the Net PIN at 30. The customer then clicks on a button 32 to send the registration information to the system's server 18 where it is stored in database 20 in association with the customer's stored PAN and encrypted PIN. The system takes the PAN card number and compares it to the PAN card number from the first step, takes the new user name and associates it with the PAN card number, takes the new secret Net PIN supplied and associates it with the user name. After the system has successfully completed the above it informs the customer that registration has been successful by displaying a message on screen and sending the same message to the e-mail address supplied.

As a second variant of the system, to avoid rejection of duplicate transactions, on registration, server 18 decrypts the customer's PIN using the decryption key provided to the system by the POS system and stores the decrypted PIN in database 20 in association with the PAN (further secured for storage as necessary). Each time the customer authorizes a debit transaction as described below through the system, the server 18 encrypts the PIN to form part of the POS debit transaction as if it were a POS terminal. The server 18 may be operated by a Trusted Third Party.

As a further optional step in the registration process, the customer can be prompted to set limiters on transfers out of his/her account, such as the maximum amount which is permitted to be transferred per transaction or per time period. In the case of a user which is a company, only certain people may be authorized to pay out funds.

Once two or more customers of the system are registered, it is possible to transfer money from one bank account to another in real time. The transaction becomes real time because the Point of Sale (POS) Electronic Funds Transfer (EFT) system carries out the actual transfer.

A merchant who wishes to permit its customers to use the system for online debit card payments also registers with the system using its bank debit card in the same way so the system has a PAN and an encrypted PIN for its bank account associated with a merchant username, such as an email address, and a second secret ID number.

Figure 3:
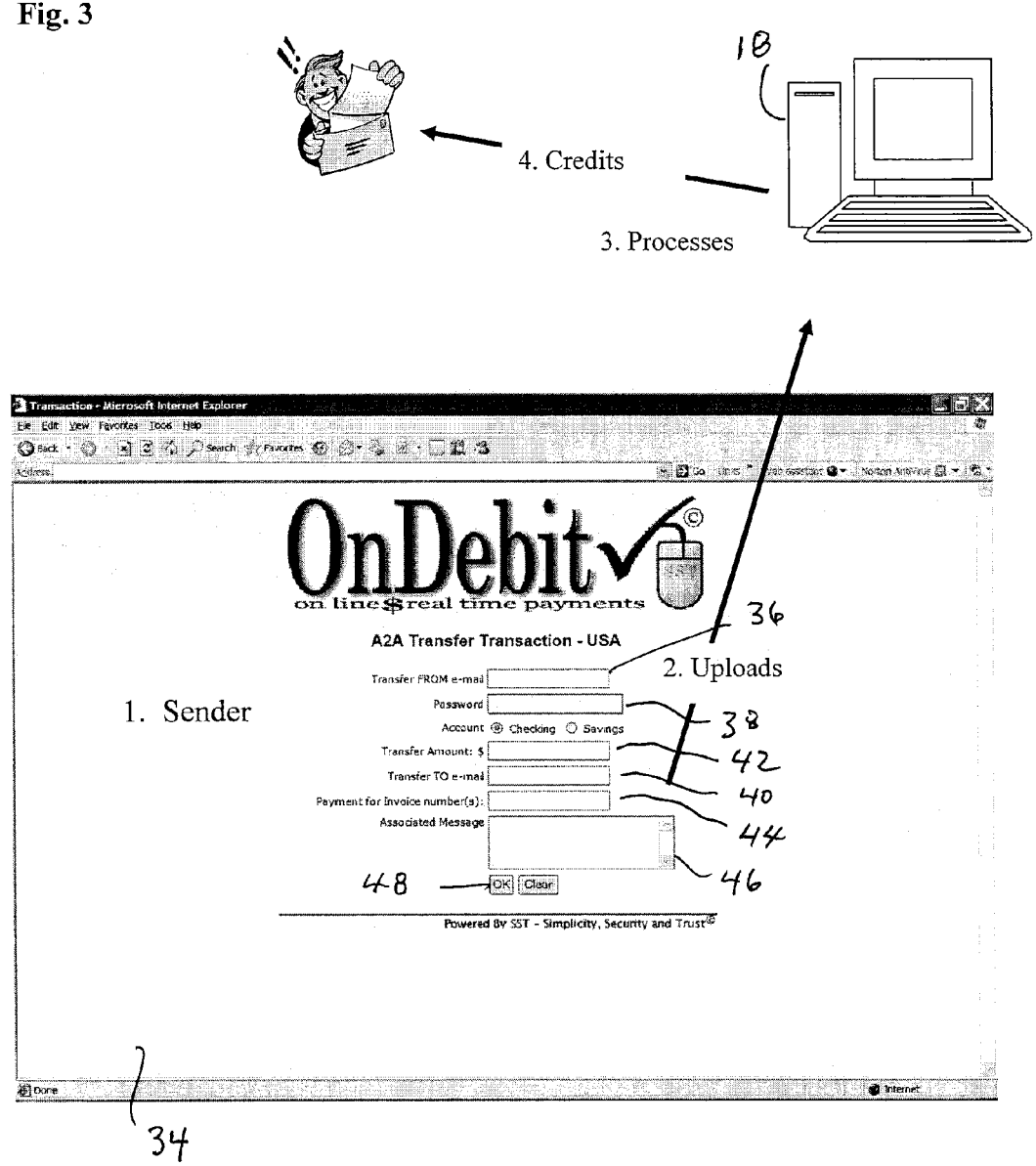
FIG. 3 is a schematic diagram illustrating an account-to-account payment procedure using the invention.

The method of carrying out a single account-to-account transaction using the system is illustrated in FIG. 3. A user who wishes to transfer funds to another registered party logs onto the appropriate web page 34 served up by the system's server 18 or his/her banking page which then transfers the information to the system's server 18. The user enters his or her unique user name, preferably his/her email address, at 36, enters his/her secret Net PIN number at 38, enters the unique identifier, such as the email address, of the intended recipient of the funds at 40, enters the value of transaction at 42, enters payment related information such as invoice number at 44 and any associated message at 46. The customer then clicks on a button 48 to send the transfer information to the system's server 18. The system validates sender's unique identifier and Net PIN, validates the recipient's unique identifier, retrieves the sender's PAN and encrypted PIN from database 20 and combines it with the other required information along with the value of transaction to form a standard debit POS transaction. It then feeds the standard POS transaction into the POS system to receive approval or denial. The system works, except for duplicate transactions, because in the United States the same encrypted PIN number can be used indefinitely for debit POS transactions.

Upon approval server 18 then takes recipient's PAN, and encrypted PIN from data base and puts it together with other required information such as the transaction value to form a standard credit POS transaction. It then displays a confirmation of receipt of the transaction on the sender's screen and sends a further copy of the transaction to both sender and recipient via e-mail. The receipt can contain related information such as invoice number and associated messaging.

In the second variant of the system to avoid rejection of duplicate transactions, where on registration server 18 has stored the decrypted customer PIN using the decryption key provided by the POS system (further secured for storage as necessary), each time the customer authorizes a debit transaction through the system, the server 18 encrypts the PIN to form part of the POS debit transaction as if it were a POS terminal. The server 18 may be operated by a Trusted Third Party.

The method of carrying out multiple account-to-account transactions is as follows. The customer uploads a file with two or more payments to be made to the system's server 18 or his/her bank which then forwards the payment instructions to the system's server 18. The uploaded file contains all the payment instructions as in the single account-to-account transaction described above. This uploaded file may contain the sender's user name and Net PIN, or the server 18 or his/her bank may serve up a page requesting the sender's user name and Net PIN. The system validates the sender's user name and Net PIN and may require the sender to submit two sets of user names and Net PINS as in the case of dual signature requirements for company cheques. The system validates each and every recipient's username, validates the limiters placed on transfer(s) from this account and to which payee(s), takes the sender's PAN and encrypted PIN from database 20 and combines them with the other required information along with the total value of all the transactions to form a standard debit POS transaction. If the total value of all the transactions is greater than the maximum value allowed under a single POS transaction, the server 18 can break down the total value of the transactions into units less than the total allowed value such that the sum of the units equals the total value of the original. The server 18 then feeds the standard POS transaction(s) into the POS system to receive approval or denial. Upon approval it then takes recipients' PAN, encrypted PIN from database 20 and puts it together with the other required information such as the transaction value to form a standard credit POS transaction(s).

In the second variant of the system to avoid rejection of duplicate transactions, where on registration server 18 has stored the decrypted customer PIN using the decryption key provided by the POS system (further secured for storage as necessary), when the server forms the POS transaction, the server 18 encrypts the PIN to form part of the POS debit transaction as if it were a POS terminal. The server 18 may be operated by a Trusted Third Party.

Figure 4:
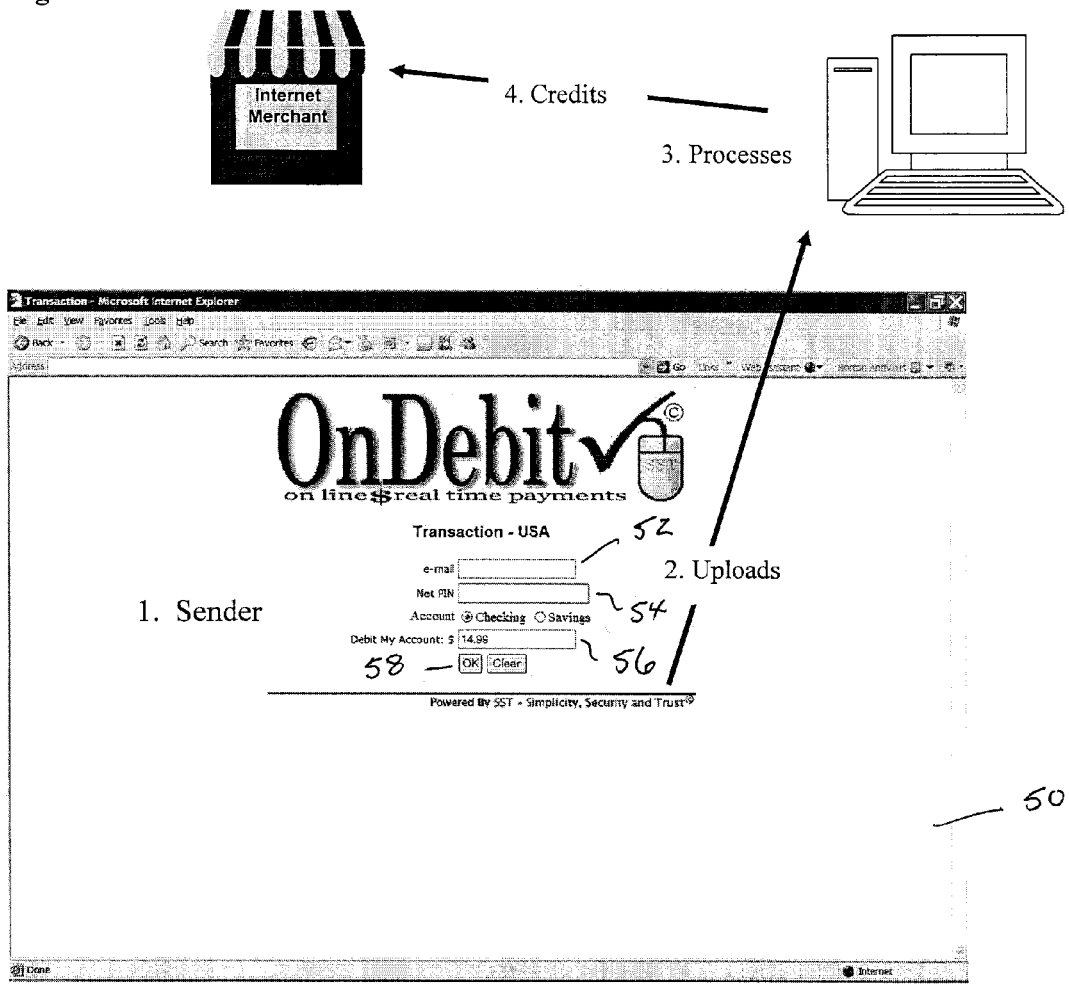
FIG. 4 is a schematic diagram illustrating an on-line merchant payment procedure using the invention.

The method of using the system for a customer to make an online debit payment at the web page of a registered merchant is illustrated in FIG. 4. At the web merchant's site a customer may order a product or service and choose the systems' online debit payment as a payment option. If the customer selects online debit payment as a payment option, the merchant serves up the payment page 50 or instructs its Financial Institution (FI) to serve up the payment page 50, which contains the merchant user name, value of the transaction 56 and any related and required other data. The customer enters his or her user name (e-mail address) at 52, and his/her secret Net PIN at 54. The customer then clicks on a button 58 to send the information to the system's server 18. The system then validates customer's user name and Net PIN, validates the merchant's user name, which was communicated from the merchant web site on selection of the debit payment option, retrieves the customer's PAN and encrypted PIN from database 20 and combines it with the other required information along with the value of transaction to form a standard debit POS transaction. It then feeds the standard POS transaction into the POS system to receive approval or denial. After server 18 receives the approval or denial it passes the information back to the merchant so it may continue with the order process as it elects. Upon approval server 18 then takes merchant's PAN, encrypted PIN from data base and puts it together with other required information such as the transaction value to form a standard credit POS transaction. It then displays a receipt of transaction on screen and sends a further copy of the transaction to both sender and recipient via e-mail. The receipt can contain related information such as invoice number and associated messaging.

Again in the second variant of the system to avoid rejection of duplicate transactions, where on registration server 18 has stored the decrypted customer PIN using the decryption key provided by the POS system (further secured for storage as necessary), each time the customer authorizes a debit transaction through the system, the server 18 encrypts the PIN to form part of the POS debit transaction as if it were a POS terminal. The server 18 may be operated by a Trusted Third Party.

The merchant can elect to receive its funds at the time of each and every transaction or aggregate the transactions for a set period of time, such as at the end of each day, or aggregate the transactions until a minimum or maximum value is reached before receiving its funds and have one bulk credit done at that time. Reporting under the aggregation method can be done at the time of the transaction and/or at the time of successful payment of funds to the merchant.

Figure 5:
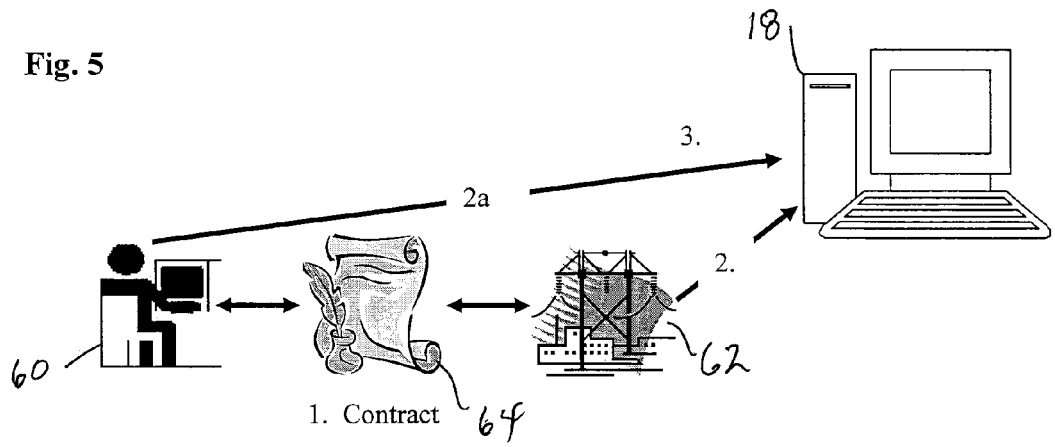
FIG. 5 is a schematic diagram illustrating a pre-authorized debit using the invention.
Figure 5:
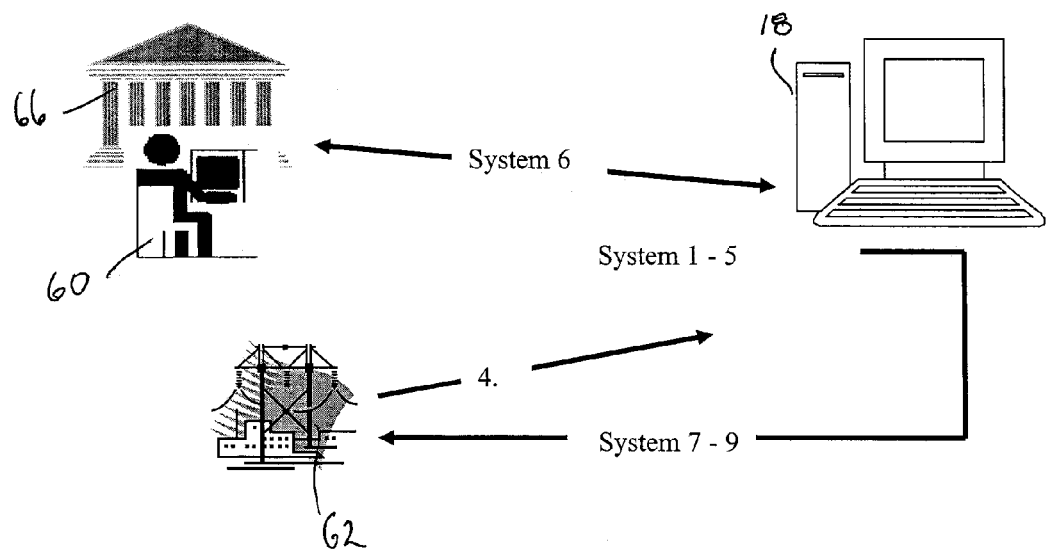
Figure 6:
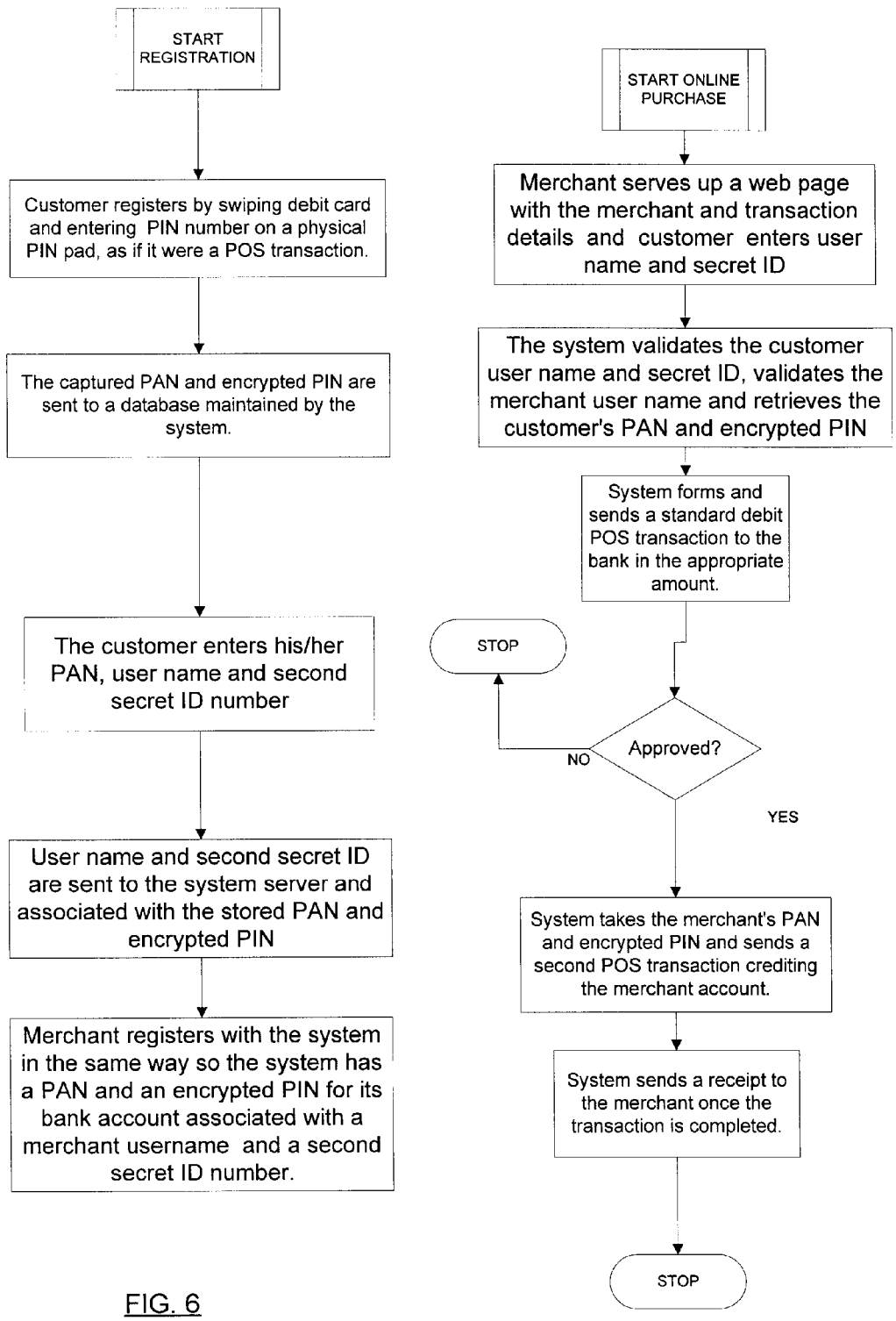
FIG. 6 is a flowchart illustrating the method of the invention.

The method of carrying out a Pre-Authorized Debit in Real Time (PADRT) using the system is illustrated in FIG. 5. The methods described above have a common factor in that the payment is always initiated by the payor 60, namely someone wanting to make a payment, which is known as a "credit push". Business such as utilities or loan companies (payees 62) have a need to pull down the funds from time to time in fixed or variable amounts. By having simple contractual arrangements between the payee 62 and the customer (payor) 60 it is possible to use the present invention for pulling down payments in real time, referred to as Pre-Authorized Debit in Real Time (PADRT).

First the Payee 60 and Payor 62, who have both registered with the system, enter into contractual arrangements, in the form of contract 64 which allow the payee to pull down the funds from time to time. Payor can place limiters on the type and/or amounts, dates and other limitations on pre-authorized transfer(s). Payee reports to the system's server 18 that this payee 60 and payor 62 have agreed to use the PADRT service. The server 18 logs the appropriate payor(s) information into the database 20 with the required information to execute a PADRT transaction.

When a payment request is sent by the Payee to the server 18, the server is provided the user name and Net PIN of the Payee, the user name of the Payor and the transaction value and related information. The system server 18 validates the payee (recipient) user name, Net PIN and that this payee is permitted to use the PADRT method. Server 18 validates payor(s) user name, validates that this payor and payee are in contractual agreement to use the PADRT method, validates the limiters placed on transfer(s) from this payor to this payee, takes payor's PAN, encrypted PIN from database 20 and combines them with the other required information to form a standard debit POS transaction, feeds the standard debit POS transaction(s) into the POS system to receive approval or denial. Upon approval it then takes payee's PAN, encrypted PIN from data base and puts it together with the other required information such as the transaction value to form a standard credit POS transaction(s). The payee can elect to receive it's funds at the time of each and every transaction or aggregate the transactions for a set period of time or aggregate the transactions till a minimum/maximum value is reached before receiving it's funds. Server 18 may inform the payee of each and every requested transaction at the time of the transaction or it my report back at some requested point in the future.

Once again in the second variant of the system to avoid rejection of duplicate transactions, where on registration server 18 has stored the decrypted customer PIN using the decryption key provided by the POS system (further secured for storage as necessary), each time the customer authorizes a debit transaction through the system, the server 18 encrypts the PIN to form part of the POS debit transaction as if it were a POS terminal. The server 18 may be operated by a Trusted Third Party.

A number of variants on the registration process described above are possible. For the initial registration step, as an alternative, the system first enters into a contractual relationship with a physical merchant having a POS terminal (PINpad). A potential customer at the POS terminal (PINpad) is asked if they would like to sign up for the new online debit payment service during or before a standard POS transaction is uploaded for approval. Upon agreement a copy of the standard POS transaction is passed on to the server 18.

As another alternative for the initial registration step, the system first enters into a contractual relationship with a physical merchant having a POS terminal (PINpad). The system enters into a contractual relationship with a physical merchant and the POS network. A potential customer at the POS terminal (PINpad) is asked if they would like to sign up for the online debit payment service during or before a standard POS transaction was to be uploaded for approval. Upon agreement the standard POS transaction would be modified to indicate agreement and then passed on to the POS system for processing. The POS system after approval of the standard POS transaction would forward a copy of the PAN, encrypted PIN and related data to the server 18.

As another alternative for the registration process, the system first enters into a contractual relationship with a physical merchant having a POS terminal (PINpad). The system enters into a contractual relationship with a card issuing Financial Institution (FI) 66. A potential customer is offered the online debit service sign up through his/her online banking page. Upon agreement, the FI forwards the customer's PAN and encrypted PIN in the required format to the server 18. The FI may also forward the customer's other required information such as e-mail address and online banking shared secret in some other agreed upon format. This would eliminate the need for the second step in the registration process.

As another alternative for the initial registration step, the system first enters into a contractual relationship with a physical merchant having a POS terminal (PINpad). The system enters into a contractual relationship with a card issuing Financial Institution (FI). A potential customer is offered the online debit service sign up thru an ATM. Upon agreement the FI would forward the customer's PAN and encrypted PIN in the required format to the server 18. The FI may also forward the customer's other required information such as e-mail address and online banking shared secret in some other agreed upon format. This again eliminates the need for the second step in the registration process.

As another alternative for the initial registration step, the system first enters into a contractual relationship with a physical merchant having a POS terminal (PINpad). The system enters into a contractual relationship with a card issuing Financial Institution (FI). A potential customer is offered the online debit service sign up at the time of opening a new bank account. Upon agreement, the FI forwards the customer's PAN and encrypted PIN in the required format to the server 18. The FI may also forward the customer's other required information such as e-mail address and online banking shared secret in some other agreed upon format. This again eliminates the need for the second step in the registration process.

As another alternative for the initial registration step, the system enters into a contractual relationship with a card issuing Financial Institution (FI). The FI forwards some or all of its customers who subscribe to online banking and have related PIN based debit cards the required information in the agreed upon format such as required to be able to use the online debit service. The FI may also forward the customer's other required information such as e-mail address and online banking PIN number in some other agreed upon format. This eliminates the need for the previously described registration process.

As a variant on the second step of the registration process, a customer who has completed the first registration step logs onto his internet banking site and carries out the first step of registration through the banking site. The banking site then communicates with the server 18. The registration process is then other wise the same except that all communication is done through the customer's internet banking site.

While a number of exemplary aspects and embodiments have been discussed above, those of skill in the art will recognize certain modifications, permutations, additions and sub-combinations thereof.

What is claimed is:

1. A method for online debit payments to a payee by a payor using a central payment system and a debit card issued by a financial institution having associated PAN and PIN numbers said PAN and PIN numbers being associated by said financial institution with said debit card, the method comprising:
  a) said payor registering with said central payment system by:
    i) entering said payor's PAN number;
    ii) entering said payor's PIN number;
    iii) encrypting said payor's PIN number with an encryption key and communicating said PAN number and encrypted PIN number and encryption key to a database maintained by the system and storing said PAN number and encrypted PIN number and encryption key;
    iv) said payor entering a user name and a secret ID number, different from said payor's PIN number, which are associated with the stored PAN and encrypted PIN numbers and encryption key;
  b) said payee registering with said central payment system by:
    i) storing said payee's PAN number;
    ii) said payee entering a payee PIN number;
    iii) encrypting said payee's PIN number and communicating said payee's PAN number and encrypted payee PIN number and encryption key to a database maintained by the system, and storing said payee's PAN number and encrypted payee PIN number and encryption key;
    iv) said payee entering a user name and a secret ID number, different from the payee PIN number, which are associated with the stored payee's PAN and encrypted payee PIN number;
  c) said payor making an online debit payment by:
    i) displaying to said payor a payment web page with the amount of said online debit payment transaction;
    ii) said payor entering said payor's user name and secret ID number;

iii) communicating said payor's user name and secret ID number, the amount of said online debit payment transaction and said payee's user name to the system server;
iv) said system validating said payor's user name and secret ID number, validating said payee's user name and retrieving said payor's PAN and encrypted PIN numbers and encryption key and sending a debit POS transaction to said financial institution in the amount of said online debit payment transaction;
v) said financial institution decrypting said PIN number and approving or disapproving said debit POS transaction;
vi) if said POS transaction is approved, retrieving said payee's PAN and encrypted PIN numbers and encryption key and sending a second POS transaction crediting said payee's account.

2. The method of claim 1 wherein said payor enters said amount of said transaction and said payee's user name on said web page prior to communicating said payor's user name and secret ID number, the amount of said online debit payment transaction and said payee's user name to the system server.

3. The method of claim 1 wherein said amount of said transaction and said payee's user name are served up to said payor with said web page.

4. The method of claim 3 wherein said web page is served up to said payor's internet browser by said payee's server.

5. The method of claim 3 wherein said web page is served up to said payor's internet browser by said payee's financial institution's server.

6. The method of claim 1 wherein said online transaction is carried out at the web site of said payee, and said payor selects a debit payment option for carrying out said online transaction prior to being served up said web page by said payee.

7. The method of claim 6 wherein said payee's user name is communicated to said system server upon selection of said debit payment option.

8. The method of claim 1 wherein said payor's PAN number is entered by reading said PAN number from a debit card issued by a financial institution by a card reader.

9. The method of claim 1 wherein said payor's PIN number is entered by entering said PIN number on a physical PIN pad.

10. The method of claim 1 comprising the further step of said sending a receipt to said payee after said second POS transaction has completed.

11. The method of claim 1 wherein said payor's PIN number is decrypted and stored at said system server, and re-encrypted with each POS transaction.

12. The method of claim 1 wherein said payor enters a plurality of payments to a plurality of payees on a single payment web page.

13. The method of claim 9 wherein said payor's PAN number is entered from said debit card by a debit card reader, and said PIN number is encrypted by said PIN pad using said encryption key.

* * * * *